United States Patent [19]

Yamazaki

[11] Patent Number: 4,823,258
[45] Date of Patent: Apr. 18, 1989

[54] INDEX LIMITED CONTINUOUS OPERATION VECTOR PROCESSOR

[75] Inventor: Isamu Yamazaki, Kawasaki, Japan

[73] Assignee: Tokyo Shibaura Denki Kabushiki Kaisha, Kanagawa, Japan

[21] Appl. No.: 98,313

[22] Filed: Sep. 18, 1987

Related U.S. Application Data

[63] Continuation-in-part of Ser. No. 940,211, Dec. 5, 1986, abandoned, which is a continuation of Ser. No. 469,630, Feb. 25, 1983, abandoned.

[30] Foreign Application Priority Data

Feb. 26, 1982 [JP] Japan .................................. 57-28905

[51] Int. Cl.$^4$ ............................................. G06F 01/00
[52] U.S. Cl. ..................................... 364/200; 364/736
[58] Field of Search ................ 364/200, 900 MS File, 364/736

[56] References Cited

U.S. PATENT DOCUMENTS

| 3,827,031 | 7/1974 | Kastner et al. | 364/200 |
|---|---|---|---|
| 4,025,771 | 5/1977 | Lynch, Jr. et al. | 364/200 |
| 4,051,551 | 9/1977 | Lawrie et al. | 364/200 |
| 4,149,242 | 4/1979 | Pirz | 364/200 |
| 4,270,181 | 5/1981 | Tanakura et al. | 364/200 |
| 4,293,941 | 10/1981 | Muraoka et al. | 364/200 |
| 4,435,758 | 3/1984 | Lorie et al. | 364/200 |

FOREIGN PATENT DOCUMENTS

1575215 of 0000 United Kingdom .

OTHER PUBLICATIONS

H. Aiso et al., "A Very High-Speed Microprogrammable Pipeline Signal Processor," Proceedings of the IFIP Congress 1974, 5th–10th Aug. 1974, pp. 60–64.
J. S. Liptay et al., "Load Bypass For Address Arithmetic", IBM Technical Disclosure Bulletin, vol. 20, No. 9, pp. 3606–3607 Feb. 1978.

*Primary Examiner*—Gary V. Harkcom
*Assistant Examiner*—Christopher Lynt
*Attorney, Agent, or Firm*—Finnegan, Henderson, Farabow, Garrett & Dunner

[57] ABSTRACT

The vector processor of the present invention is designed to have a first function for classifying, generating and storing in advance a separate index set by judging the attribute of specified data and a second function for continuously performing operand access only for the index value belonging to the specified index set out of the index sets generated by the first function, thus avoiding the deterioration of the efficiency of pipeline processing even when the calculation of array data has different operation content according to the attributes of the specified data. Accordingly it can perform continuous calculation of a plurality of different conditioned expressions at high speed by arranging it to operate the first and the second functions concurrently with the value resulting from the operation by the second function being used by the first function as a data for discriminating the attribute of the data.

2 Claims, 6 Drawing Sheets

| ADDRESS | INDEX |
|---|---|
| ⋮ | ⋮ |
| 300 | 1 |
| 301 | 2 |
| 302 | 3 |
| 303 | 4 |
| 304 | 5 |
| 305 | 6 |
| 306 | 7 |
| 307 | 8 |
| 308 | 9 |
| 309 | 10 |
| ⋮ | ⋮ |
| 1200 | ■ |
| 1201 | ■ |
| 1202 | 2 |
| 1203 | 1 |
| 1204 | 3 |
| 1205 | 4 |
| 1206 | 6 |
| 1207 | 7 |
| 1208 | 5 |
| 1209 | 8 |

$IB_0 \Rightarrow$ (at 300), U (brace spanning 300–309), $IB_1 \Rightarrow$ (at 1200)

(b)

| I ($IB_0$ + I) | G(I) | V | W |
|---|---|---|---|
| 1 | — | ■ | ■ |
| 1 | POSITIVE | 1 | ■ |
| 2 | NEGATIVE | 1 | 2 |
| 3 | NEGATIVE | 1 | 3 |
| 4 | POSITIVE | 4 | 3 |
| 5 | NEGATIVE | 4 | 5 |
| 6 | POSITIVE | 6 | 5 |
| 7 | POSITIVE | 7 | 5 |
| 8 | POSITIVE | 8 | 5 |
| 9 | NEGATIVE | 8 | 9 |
| 10 | POSITIVE | 10 | 9 |

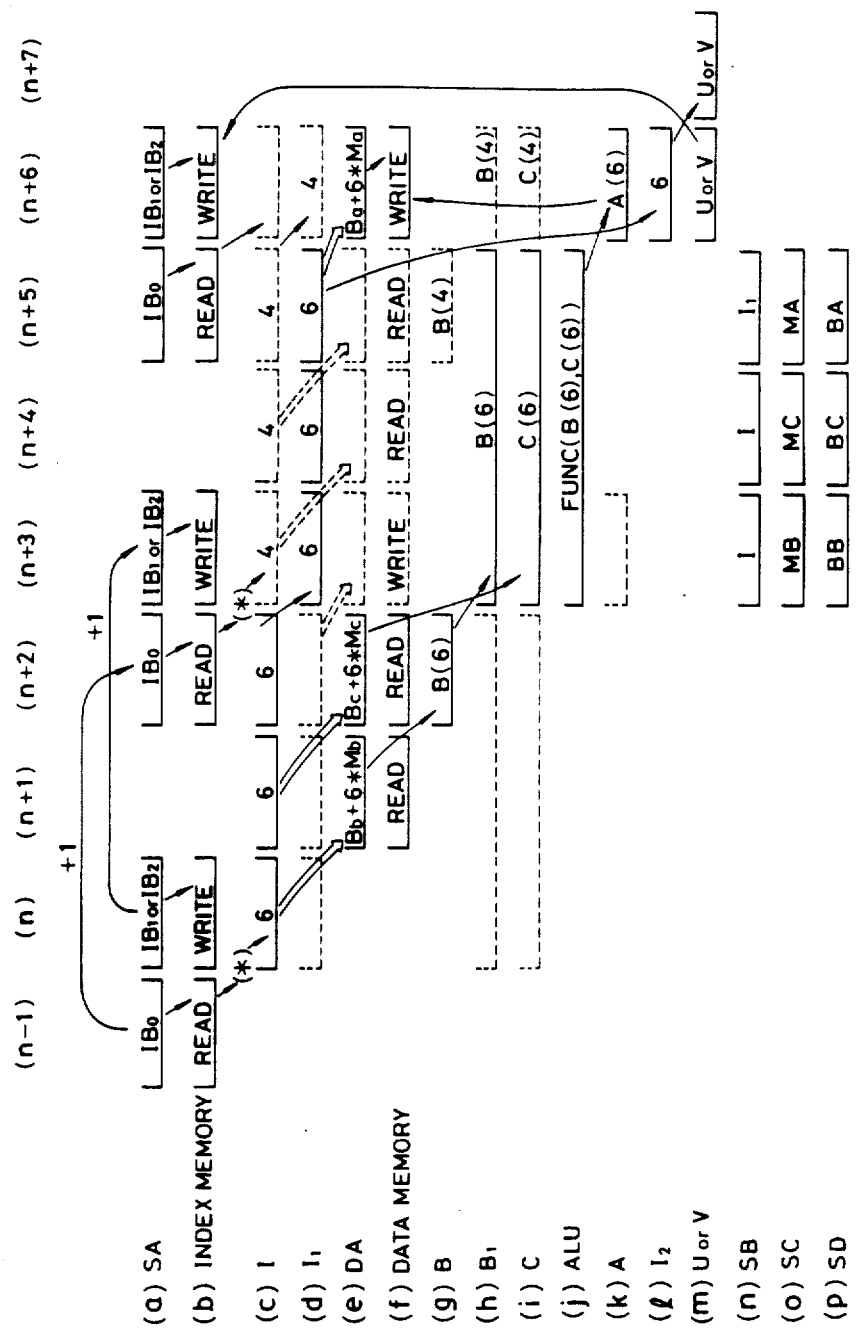

INDEX LIMITED CONTINUOUS OPERATION VECTOR PROCESSOR

BACKGROUND OF THE INVENTION

This a continuation-in-part application of Ser. No. 06/940,211, which was a continuation application of Ser. No. 06/469,630, both of which are now abandoned.

The present invention relates to a processor capable of performing vector and matrix calculations often required in scientific and engineering computations.

As the scale of the object to be calculated becomes larger, calculations of vectors and matrices are required. When these calculations are to be performed using a computer, elements of those vectors and matrices are normally stored in the memory of the computer at a fixed address interval in the sequence of indices thereof. Such a data set is called an "array." A vector processor (or an array processor) is designed to perform continuous operations of the same kind at high speed for the data stored at a fixed address interval using a so-called pipeline technique in an attempt to increase the calculation speed. A prior art vector processor can perform such calculations as shown in Examples 1 and 2 below at a high speed.

(Example 1)

DO 10 I=1, 100
A(I)=B(I)*C(I)
10 CONTINUE (Example 2)

DO 20 J=1, 99, 2
X(I, J)=Y(I, J)+Z(J)
20 CONTINUE

However, in practice, there are many cases where the expression to be calculated varies in each element by a specified condition as shown in Example 3 below (conditioned expression).

(Example 3)

DO 30 I=1, 100
IF(G(I).GT.0.0) A(I)=A(I)+C(I)
IF(G(I).LE.0.0) A(I)=A(I)*D(J, I)
30 CONTINUE

In the above case, the operation content varies according to whether G(I) is positive or negative (or zero). In addition, since the operand varies (i.e. C(I) or D(J, I)), the calculation process is interrupted each time, thus making it impossible for the prior art vector processor to process smoothly.

SUMMARY OF THE INVENTION

The object of the present invention is to provide a vector processor capable of a processing operation on an array wherein the processor's operation content varies according to the value of each element of the specified array and which operates smoothly and at a high speed.

In order to achieve the above object, a vector processor of the present invention is provided with a first function to evaluate the condition of the value of each element of the specified array, and to generate/store in advance separate index sets corresponding thereto, together with a second function which operates to perform continuous operand access only to the index value belonging to a corresponding specified index set out of the index sets thus generated, thereby making it possible to preserve the efficiency of the pipeline processing even when the expression to be calculated is conditioned.

For example, the vector processor of the present invention performs the calculation of Example 3 in the following three steps.

(Step 1) Classification of Indexes
POSG={I | G(I)>0}, NEGG={J | G(I)≦0}
(Step 2) Calculation
FOR I POSG, A(I)=A(T)+C(I)
(Step 3) Calculation
FOR I NEGG, A(I)=A(I)*D(J, I)

where POSG is the set of index I which is defined by G(I)>0, NEGG is the set of index J which is defined by G(I)≦0. That is, in the first step, POSG, which is the set of index J such as G(J)>0, and NEGG, which is the set of index I such as G(I)≦0, are separately generated and stored in advance by the first function. In the second step, using the second function, operand access is continuously performed to execute calculation A(I)=A(I)+C(I) for the index I, belonging to set POSG, out of index sets generated using said second function. Then, in the third step, again using the second function, operand access is continuously performed to execute calculation A(I)=A(I)+C(I) for the index I, belonging to set POSG, out of index sets generated using said second function. Then, in the third step, again using the second function, operand access is continuously performed to execute calculation A(I)=A(I)*D(J, I) for index I, belonging to set NEGG, out of index sets generated in the first step using said second function. In this matter, the calculation processing can be done smoothly without interrupting the pipeline.

In addition, the vector processor of the present invention is designed so that the calculation step for a certain (conditioned) expression and the classification step for the calculation of the succeeding conditioned expression can be performed simultaneously. In this manner, because the time required for the generation of each index set during the process can be saved even when a calculation is performed continuously on more than one expression, calculation processing alone can be continuously performed, making it possible to greatly reduce the calculation processing time as a whole.

In this manner, the vector processor of the present invention can perform smoothly the calculation of array data with an expression being conditioned by the value of each element of the specified data array (for example, when in a certain critical curve, the evaluation equation differs between its sides, and even if a continuous calculation is performed for a plurality of different expressions, the calculation can be performed at a high speed. Since the calculation of a certain expression and the generation of an index set for the next expression are performed concurrently, the operation can be performed according to a program in which less efficient instructions such as conditional branch instructions are minimally used.

In addition, in the case of a sparse matrix, using this invention the calculation can be performed at high speed by eliminating the calculation for zero elements for the calculation of product of matrix and vector, etc. wherever possible. On the other hand, the vector processor of the present invention can easily perform calculations in which only non-zero elements are selected, making it possible to handle a sparse matrix efficiently.

This has so far been very difficult to achieve in conventional vector processors.

BRIEF DESCRIPTION OF THE DRAWINGS

In the accompanying drawings:

FIG. 2(a) and 2(b) illustrate the manner in which indices are stored in the index memory shown in FIG. 1;

FIG. 6 is a time chart showing an example of the operation of the vector processor shown in FIG. 4.

DESCRIPTION OF THE PREFERRED EMBODIMENT

The vector processor of the present invention will now be described in detail with reference to the drawings.

Figure 1:
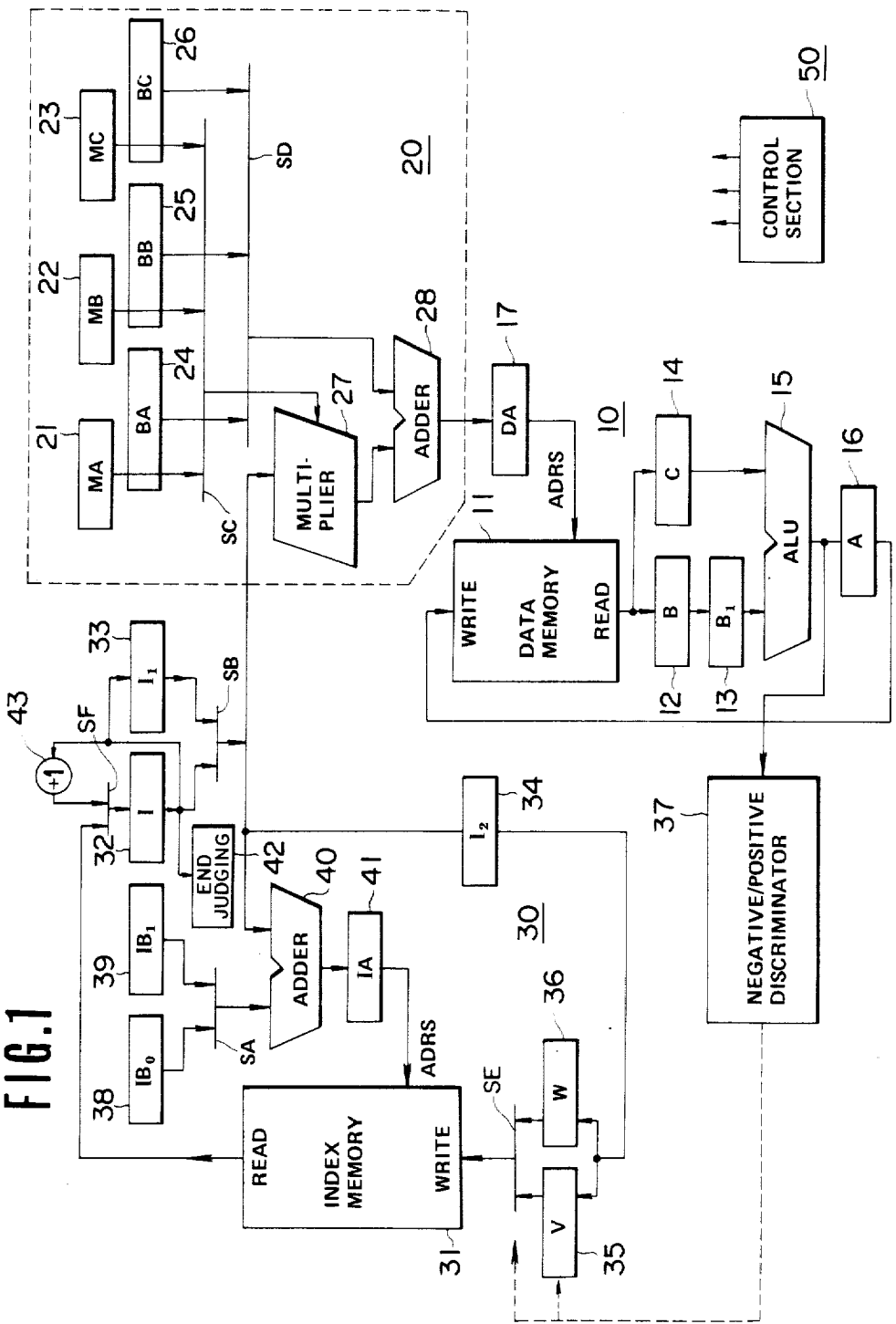
FIG. 1 is a block diagram showing the configuration of a preferred embodiment of the vector processor of the present invention.

FIG. 1 shows a preferred embodiment of the vector processor of the present invention.

As shown in FIG. 1, the vector processor of the present invention is comprised of a vector operation section 10, an operand address calculation section 20, an index calculation section 30, and a control section 50 for controlling those sections as a whole in order to cause those sections to perform the later-mentioned specified processing. The control section 50 includes a program memory which stores instruction sequences as programs.

Of those sections, the vector operation section 10 is for performing a specific operation on specified data, i.e., vectors and matrices (hereafter referred to as arrays). These specifications are made by instructions stored in the program memory. The section 10 is comprised of a data memory 11 for storing operand data, operation result data, and other data, a B register 12 and a C register 14 for temporarily storing data read from the data memory 11, a B1 register 13 for temporarily storing data read from the B register 12, an ALU 15 for performing a specified operation on the couple of data in the B1 register 13 and in the C register 14, an A register 16 to temporarily storing the operation result from the aLU 15, and a DA register 17 for temporarily storing addresses to be fed from the operand address calculation section 20 to the data memory 11.

The operand address calculation section 20 is used for calculating the addresses of the operands required for a sepcific operation, i.e., addresses of arrays in the data memory 11, and is comprised of an MA register 21, an MB register 22, and an MC register 23 for storing multiplier values, a BA register 24, a BB register 25 and a BC register 26 for storing base values, a selector SC for selectively outputting any one value stored in the MA register 21, MB register 22, and MC register 23 under the control of the control section 50, a selector SD for selectively outputting any one value out of those stored in the BA register 24, BB register 25, and BC register 26 under the control of the control section 50, a multiplier 27 for multiplying the value output from the selector SC by the value fed from the index calculation section 30, and an adder 28 for adding the value output from the multiplier 27 to the value output from the selector SD.

The index calculation section 30 is for generating and storing separate index sets according to the result of discrimination of the nature of the data, and comprised of an index memory 31 for storing the index sets thus generated, an I register 32 for temporarily storing the value read from the index memory 31, and an I1 register 33 for temporarily storing the value read from the I register 32, a selector SB for selectively outputting any one of the values stored in the I register 32 and the I1 register 33 under the control of the control section 50, an I2 register 34 for temporarily storing the value output from the selectro SB, a V register 35 and a W register 36 for temporarily storing the value read from the I2 register 34, a positive/negative discriminator 37 for discriminating the nature (attribute) of the value calculated at the ALU 15 of the vector operation section 10, that is, for judging "plus/minus" sign of the value calculated at the ALU 15 in this embodiment (in practice, the "positive/negative" judgement is considered sufficient as in the case of this embodiment, however, as a matter of rule judgement on "first nature/second nature" is carried out accordingly to each application), a selector SE for selecting any one of the values stored in the V register 35 and the W register 36 based on the judgement by the positive/negative discriminator 37 and for loading the selected value into the index memory 31, an IB0 register 38 and the IB1 register 39 for storing the bias value of the write or read address in the index memory 31, a selector SA for selectively outputting any one fo the values stored in the IB0 register 38 and the IB1 register 39 under the control of the control section 50, an adder 40 for determining write or read address in the index memory 31 by adding the value output from the selectro SA and the value output from the selectro SB, an IA register 41 for temporarily storing the address signal output from an adder 40, an end judging circuit 42 for judging whether or not the storage content of the I register 32 indicates the end of a certain index set through monitoring the storage content, a +1 adder 43 for increasing the storage content of the I register 32 by one particularly when only sequential numbers are sufficient as the indexes, and a selector SF for selecting any one of the value output from the +1 adder 43 and the index values read from the index memory 31 under the control of the control section 50 and for storing the value thus selected in the I register 32. The value selectively output from the selector SB is fed from time to time to the multiplier 27 of the operand address calculation section 20 described previously.

The control section 50 has a program memory (not shown) for storing programs (i.e. sequences of instructions), a sequencer (not shown) for successively fetching instructions from the program memory, and a decoder (not shown) for decoding each instruction fetched and generating necessary control signals in adequate timing for all the sections in the vector processor. No special technology is necessary, and conventional computer technologies are sufficient for designing such a control section.

After setting up these registers: IB0, IB, I, MA, MB, MC, BA, BB and BC, with appropriate values by preceding instructions, the vector processor basically performs the following operation in response to a vector instruction fetched from the program memory:

FOR I∈U, { A(I) = FUNC(B(I), C(I))
V = [I | P(A(J))]
W = [I | ~P(A(I))]

where FUNC (X,Y) is a binominal scalar operation specified by the instruction, (one of add, subtract, multiply, divide, etc.) performed at the ALU 15 of the vector operation section 10, P (X) is a propositional function of the following three kinds whose evaluations are made by the positive/negative discriminator 37; that is, any one of (1), (2), and (3) where (1): true when $X > 0$, (2): true when $X \geq 0$, and (3) true when $X = 0$, and "$\approx$" means the negation of the successive propositional expression. U, V, and W are sets of index value I which are stored in the index memory 31, and A(I), B(I), and C(I) are data corresponding to respective index I which are stored in the data memory 11. If these A(I), B(I) and C(I) are vectors, i.e., one dimensional arrays, the elements of each vector are stored in the successive locations in the data memory 11. Accordingly, if the address of the first element A(O), is Ba, the address of A(I) would be expressed as Ba+I generally. That is, the appropriate values of multipliers Ma, Mb, and Mc to be stored in the MA register 21, MB registe 22, and MC register 23 of the operand calculation section 20 respectively is 1 in this case.

On the other hand, when A(I), B(I), and C(I) are a part of array with dimensions of more than two for example, when A(I) is a three dimensional array AA(X,Y,Z) where X=J, Y=K, and Z=I, and if the address of AA (0,0,0) is Ba', the address of A(I)=AA (J, K, I) will become Ba'+J+Xmax*K+Xmax*Ymax*Ymax*I. Where Xmax is the maximum index value of X, and Ymax is the maximum index value of Y. Therefore, if Ba has the value: Ba'+J+ Xmax*K and Ma has the value: Xmax*Ymax, the above address can be calculated by the expression Ba+Ma*I. Furthermore, because only I will change in the vector operation now considered, Ba and Ma remain constant throughout the vector operation, enabling to hold Ba in the BA register 24 and Ma in the MA register 22, and to calculate the expression Ba+MA*I by the operand address calculation section 20. In other words, the expression B+M*I is sufficient in order to calculate addresses of elements of any matrix when only one index (I) can change in a vector operation, therefore the operand address calculation section 20 is sufficient for such vector operations.

In this manner, the operand address calculation section 20 can calculate actual addresses for the three sets of arrays A, B, and C. The calculation is made from the index value I from the selector SB of the index calculation section 30, the multipliers stored in MA register 21, MB register 22 and MC register 23, and the base values stored in the BA register 24, BB register 25, and BC register 26, using the multiplier 27 and the adder 28, and the results are stored in DA register 17.

In the vector processor of this embodiment, the subset of the array to be operated upon is, as described previously, specified by a set of index I, which is stored in the index memory 31, and forms an index chain. That is, in this embodiment, a certain index set (POSG for example) and its complementary set (NEGG) can be generated concurrently, and these two sets are stored in a single index area as two chains. Accordingly, if the starting address of this index area is IB, the address of the index element corresponding to the index I would be IB+I, and at this address the value of the next index in the same S index set would be stored.

An example of the method for generating such a subset (index chain), i.e., the operation of the aforementioned first step, will be described sequentially with reference to FIGS. 2(a) and 2(b).

FIG. 2(a) shows an example of the memory structure of the index memory 31, and FIG. 2(b) shows an example of the evaluated results of the propositional function for data G(I) (assumed to have been stored in the data memory 11 by a proper input means not shown) by the positive/negative discriminator 37 for the successive index I and the transistion of the content stored in each of the I register 32, V register 35, and W register 36 based on the above evaluations. It is assumed that the index set U (I E U) to be used in the intended calculation is stored in the index memory 31 from the starting address "300" in advance as shown in FIG. 2(a). It is also assumed that the value of the index I to be used in the first step 1 is the element of the index set U in the index memory 31. The address designation of the index memory 31 is, therefore, sequentially determined based on the index value I read out from the index memory. Accordingly, the aforementioned +1 adder 43 is not particularly used. The selector SF is operating so as to selectively output only index value I to be read from the index memory 31 to successively trace the chain U. The starting address of the area for the index set U is stored in advance in the IB0 register 38, the starting address of the area for the index subset to be generated by the operation described below is stored in advance in the IB1 register 39, and these values are selectively output through the selector SA from time to time according to the following operation:

(1) As the initialization, a symbol indicating the end of index set to be applied is set to the V register 35 and the W register 36. In FIG. 2, the end symbol is given by "■". Next, the content of the location pointed by IB0 in the index memory 31 is read out and (I=1) is set to the I register 32.

(2) The data G(I) corresponding to the index value in the I register 32 is read from the data memory 11 using the address given by the operand address calculation section. At this time, the ALU 15 is in the pass state, and directly outputs the data G(I) read out to the positive/negative discriminator 37 via A register 16.

(3) The nature (attribute) of the data G(I) is evaluated by the positive/negative discriminator 37. As a result, (i) if G(I) 0, the content of the V register 35 is loaded to the index memory 31 at address $IB_1 + I$, and the content of the I register 32 is set to the V register 35, and (ii) if $G(I) \leq 0$, the content of the W register 36 is loaded to the index memory 31 at address $IB_1 + I$ and the content of the I register 32 is set to the W register.

(4) The value of the IB0 register 38 and the value of the I register 32 are summed by the adder 40, the address of the index memory 32 is generated and is set to the IA register 41, and the content of the address "$IB_0 + I$" of the index memory 31 is read out and is set to the I register 32.

(5) The content of the I register 32 is checked by the end judging circuit 42. If the content is the end symbol, the operation proceeds to the processing of the next step (6), and if otherwise, the operation returns to the previous step (2).

(6) Operation is made to satisfy the following:

*POSG*=content of V register 35

NEGG=content of W register 36

As the above processing is performed sequentially, the contents stored in the I register 32, V register 35, and W register 36 change in the manner shown in FIG. 2(b), and as a result an index chain as shown in FIG. 2(a) is generated and stored. In the example shown in FIGS. 2(a) and 2(b), the contents enclosed with a circle "O" in FIG. 2(b) becomes the contents loaded in the index memory 31. In the same example, the content "10" of the V register 35 enclosed with a double circle "⊚" FIG. 2(b) becomes the POSG, and the content "9" of the W register 36 enclosed with a double circle "⊚" becomes the NEGG.

Now, because in the aforementioned example the classification was made for convenience sake based on the index set U in which the index I is arranged in a proper sequence, a chain is formed in the descending order of the index I as shown in FIG. 2. However, an arbitrary form of the arrangement of the index set U may be adopted theoretically. Accordingly, the chain form may be in an ascending order or even at random. In any case, however, at a point corresponding to the end of the index values the end symbol "■" is entered. When the chain is formed in the descending order of the index I as shown in FIG. 2, chain forming can also be made using the +1 adder. In this case, in the above step (4), the content of the I register 32 is incremented by the +1 adder 43.

Moreover, according to the generation method of the aforementioned subset, the subset of subset, i.e., product set, can be obtained by setting an optional value X to the I register 32 in step (1) shown above (causing I=X) and monitoring the end symbol "■" (this symbol is stored in the index memory 31 in advance) in step (5).

Then, in step (2): The calculation step, the operation for I POSG is performed. In this case, first index value in POSG, i.e., "10", is set to the I register 32, the index memory 31 is read taking "I+IB₁" as its address, and the index value thus read is set to the I register 32. As a result, only the values of index I whose characteristic is G(I) 0 are set to the I register 32 one after another, and thus, upon the selected subset of arrays, the same operation FUNC is performed at ALU 15.

Figure 3:
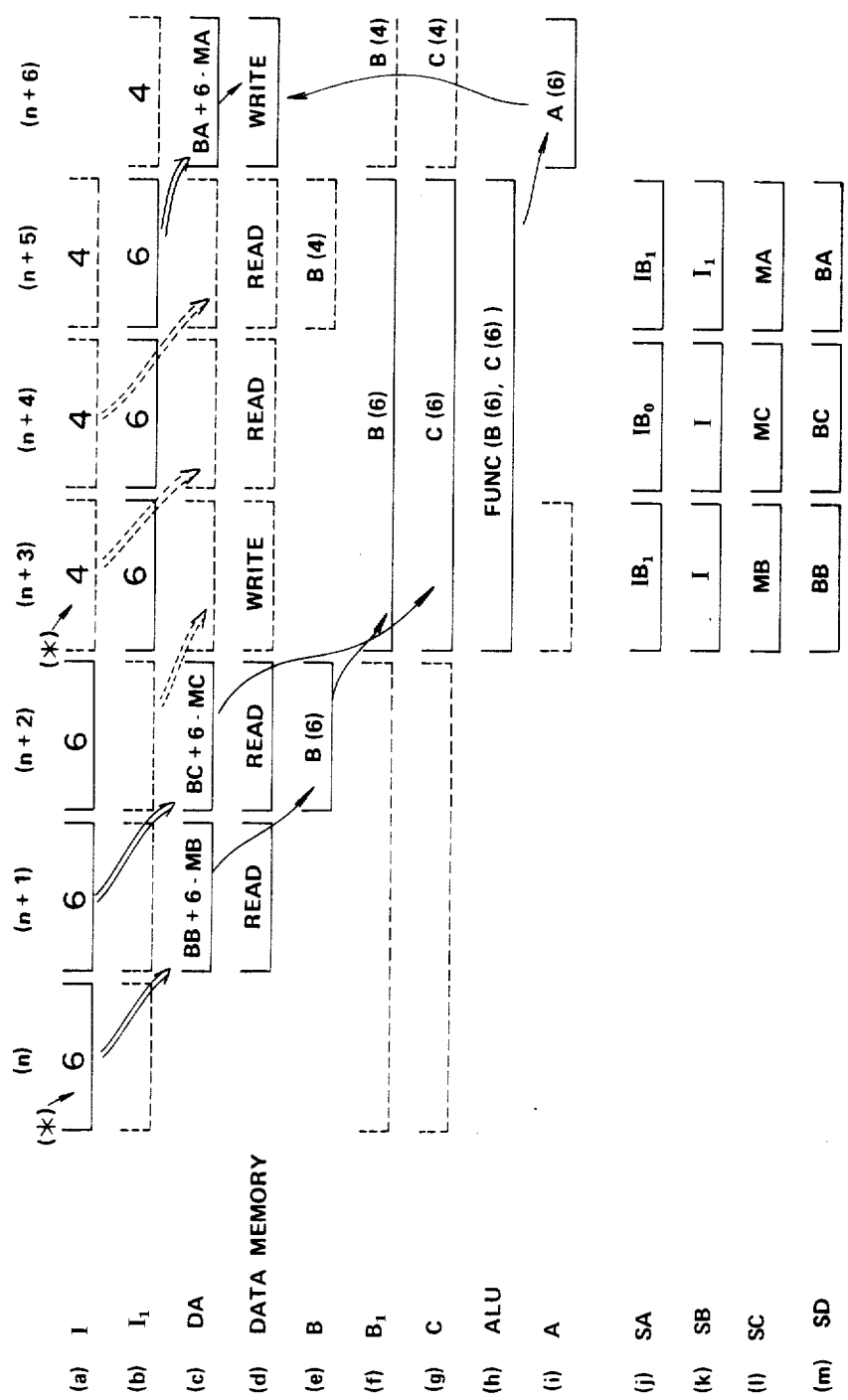
FIG. 3 is a time chart showing an example of the operation of the vector processor shown in FIG. 1.

The above operation will be described with reference to FIG. 3. In this embodiment, starting from a certain index value I, a seven-step pipeline control is performed. In FIG. 3, cycle (n−2) to cycle (n+7) are shown. The (*) mark in (d) of FIG. 3 indicates the updated timing of index I. Now, if it is assumed that "6" is set to the I register 32 at the beginning of the cycle (n) (refer to (d) of FIG. 3), the operand address calculation section 20 will start address calculation of the data B(6). That is, the multiplier 27 multiplies the value "6" of the I register 32 by the multiplier Mb of the MB register 22, and adds the base value Bb of the BB register 25 to the result of the above multiplication. The value Bb+6*Mb thus obtained is set to the DA register 17 at the beginning of the cycle (n+1) (refer to (f) of FIG. 3.) As a result, the vector operation section 10 reads the content of address Bb+6*Mb of the data memory 11, i.e., data B(6) (refer to (g) of FIG. 3,) sets the data B(6) to the B register 12 at the beginning of the cycle (n+2) (refer to (h) of FIG. 3,) and then sets the data B(6) to the B₁ register 13 at the beginning of the cycle (n+3) (refer to (i) of FIG. 3.)

On the other hand, the operand address calculation section 20 finds address Bc+6*Mc of the data C(6) i the cycle (n+1) in the same manner using the contents of the MC register 23 and the BC register 26, and sets the address Bc+6*Mc thus obtained to the DA register 17 at the beginning of the cycle (n+2) (refer to (f) of FIG. 3). Thereupon, the vector operation section 10 reads the content of the data memory 11, i.e., data C(6), specified by the content of the DA register 17 (refer to (g) FIG. 3), and sets the data C(5) to the C register 14 at the beginning of the cycle (n+3) (refer to (i) of FIG. 3). Thereafter, the vector operation section 10 starts its operation based on the data B(6) and C(6) being fed to the ALU 15 (refer to (k) of FIG. 3). The ALU 15 requires three cycles from (n+3) to (n+5) for the execution of FUNC, and during that time the contents of the B1 register 13 and the C register 14 are held (refer to (i) and (j) of FIG. 3).

Since the operation result of the ALU 15 should be stored in the data memory 11 as the data A(6), the content of the I register 36 is saved to the I1 register 33 immediately before the update (from "6" to "4") of the value of index I at the beginning of the cycle (n+3) (refer to (e) of FIG. 3). The operand address calculation section 20, during the cycel (n+5), calculates the address of the data A(6) using the content Ma of the MA register 21 and the content Ba of the BA register 24, using the saved value 6 in the I1 register 33, and sets the address Ba+6*Ma thus obtained to the DA register 17 at the beginning of the cycle (n+6) (refer to (f) of FIG. 3). And, as the operation result (FUNC B(6), C(6)) is set to the A register 16 at the beginning of the cycle (n+6) (refer to (1) of FIG. 3), the content of the A register 16 is written to the data memory 11 as data A(6) (refer to (g) of FIG. 3).

During the three cycles in which the ALU 15 executes FUNC, the operation overlaps with the write operation of the operation result immediately before to the data memory 11 in the cycle 1, or (n+3) in FIG. 3, and the operation overlaps with the read operation of the operand to be operated next in cycles 2 and 3, or (n+4) or (n+5) in FIG. 3. Further, overlapping with the write operation to or read operation from the data memory 11, the calculation of the address of operand to be required in the next cycle is being performed at the operand address calculation section 20.

As the operation of I POSG is performed in this manner, if the end mark "■" is set to the I register 32, the control section 50 detects it by the end judging circuit 42, sets NEGG, i.e., "9", to the I register 32, and completes the vector instruction. In response to the next vector instruction, the vector processor performs operation about I NEGG of the step (3) subsequently in a similar fashion.

In the above-mentioned embodiment, index set was divided into two subsets, but generally index set may be divided into a plurality of subsets, and different operations may be performed on individual subsets. Moreover, though in the above embodiment the indices were grouped based on the value G(I) in the data memory, the operation result of the ALU 15 may be used alternatively.

Accordingly, it may be so designed as to sequentially evaluate the propositional function for the operation result of the ALU 15 by the positive/negative discriminator 37 concurrent with the operation of the aforementioned steps (2) and (3), and to classify and generate an index subset for the next different operation at the index calculation section 30 based on the evaluated result.

Consequently, continuous operation on multiple different mathematical expressions can be performed, and in addition the total operation speed increases sharply due to the saving of time required for the generation of each index set during the above operation. In the embodiment shown in FIG. 2, the B register 12, B1 register 13, C register 14, and DA register 17 of the vector operation section 10, and the I register 32, I1 register 33, I2 register 34, and IA register 41 of the index calculation section 30 are for temporary storage of input values synchronized with a drive clock (not shown) signal to be output from the control section 50. Particularly, as already described, when the operation of a certain formula and the index generation for the operation of the next different formula are performed concurrently, the selectros SA and SB of the operand address calculation section 20 perform selection operation in the manner shown in FIG. 3(o) through (r) in the cycles (n+3)–(n+5).

Operation data stored in the data memory 11 are output to an output device (not shown), and printed or displayed in the specified format.

Although in the foregoing embodiment, the index set is stored into the index memory in the form of an index chain, it may be so constructed that each index is sequentially stored into the index memory 31.

Figure 4:
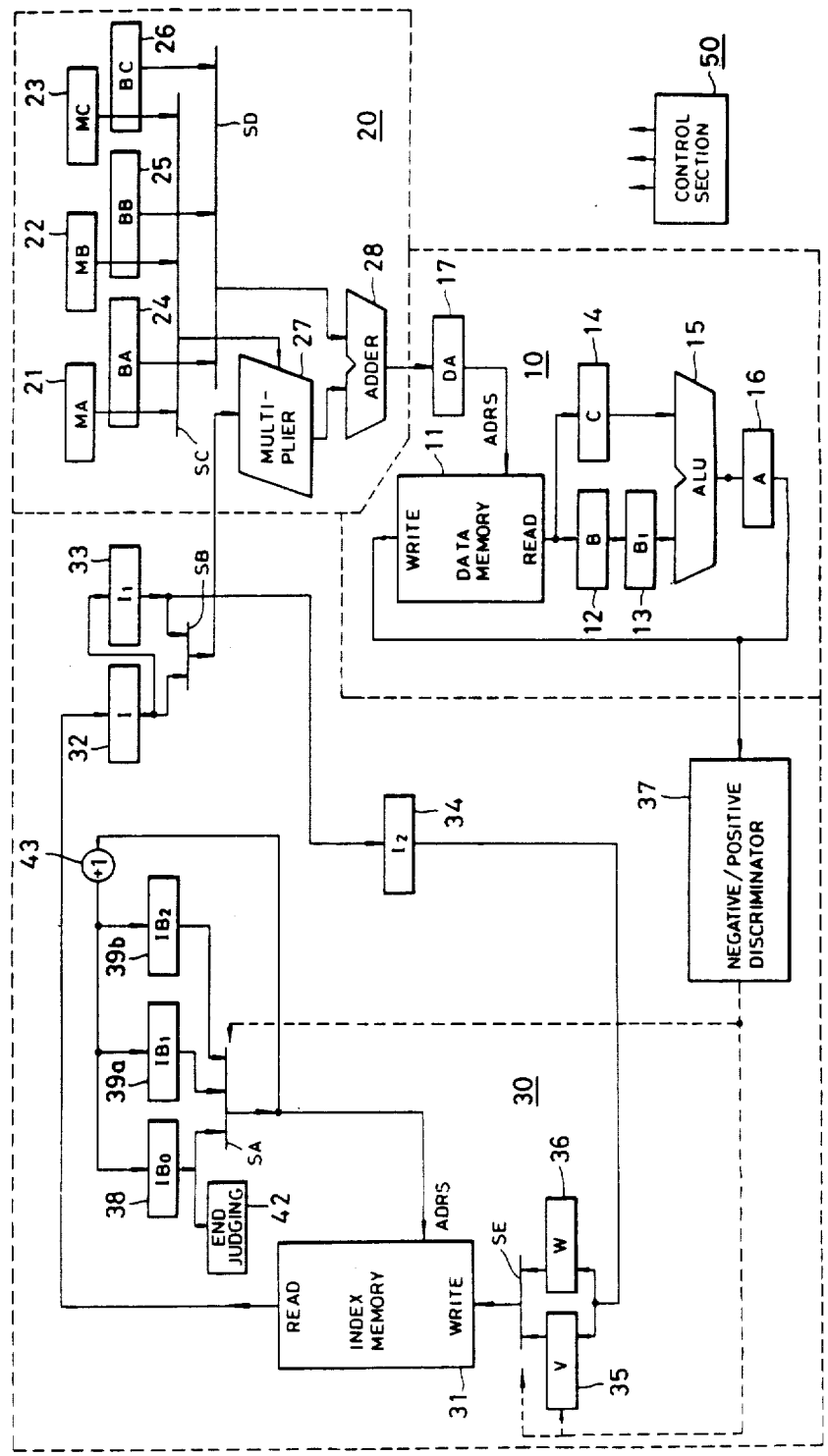
FIG. 4 is a block diagram showing the configuration of another embodiment of the vector processor of the present invention.

FIG. 4 shows an example of such construction in a manner corresponding to FIG. 1. In FIG. 4, the same reference numerals as in FIG. 1 are assigned to elements having equivalent functions to those in FIG. 1, and description of those elements is therefore omitted.

In the embodiment of FIG. 4, there are provided IB1 register 39a and IB2 register 39b as a register for storing a write address of the index memory 31 in the index calculation section 30. IB0 register 32 is, as in the foregoing embodiment, a register for storing a read address of the index memory 31.

More particularly, in this embodiment, a stored content of IB0 register 38 is used as a pointer (hereinafter called pointer IB0 for convenience) for sequentially reading out an index set to be used in calculation at ALU 15, and a stored content of IB1 register 39a and a stored content of IB2 register 39b are used as a pointer (hereinafter called pointers IB1 and IB2, respectively) for respectively pointing two index sets that are classified according to the judgement of the discriminator from the calculated result at ALU 15 (or a value in the data memory 11). As the calculation of ALU 15 proceeds, the value of the pointer IB0 is incremented by the incrementer 43. The value of the pointer IB1 or IB2 is incremented by the incrementer 43 each time the content of V register 35 or W register 36 is written into the index memory 31 at the address to which the pointer IB1 or IB2 points. During reading and writing operations based on the pointing by the pointer, the selector SA selects the pointer IB0 when timing is not write timing or selects either one of the pointers IB1 and IB2 based on the judgement of the discriminator 37, and decides as to which contents of the pointers IB1 or IB2 is to be used as a write address of the index memory 31.

Figure 5:
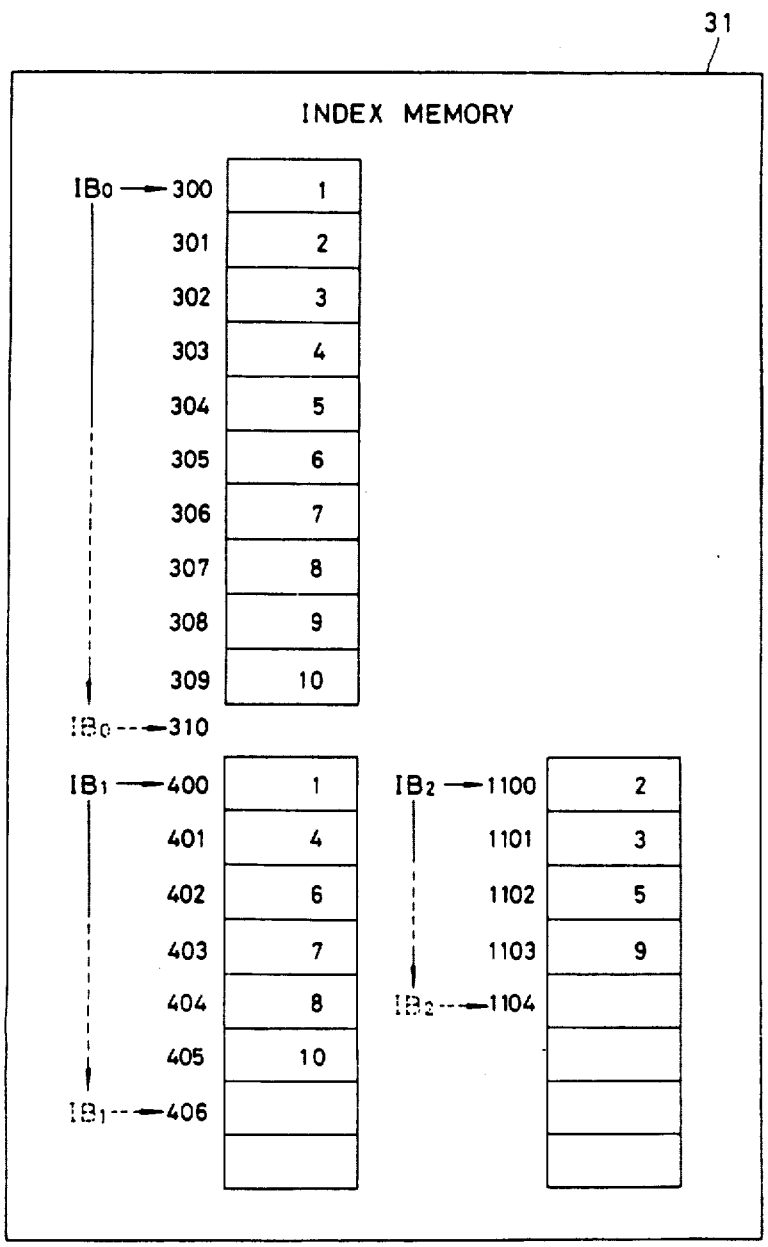
FIG. 5 illustrate the manner in which indices are stored in the index memory shown in FIG. 4.

FIG. 5 shows an example of transition in the index memory 31 of the index set thus read out, classified and written into. As shown in this drawing, according to the embodiment of FIG. 4, each element (index) of the index set is successively stored at consecutive areas of the index memory in the order of its generation.

Incidentally, in the example of FIG. 5 a register (not shown) included in the end judging circuit 42 shown in FIG. 4 stores a value "310" which corresponds to the maximum value of the pointer IB0, and the end of the index set is detected by comparing the value "310" with the current value of the pointer IB0.

FIG. 6 shows operation of the embodiment shown in FIG. 4 in the same manner as in FIG. 3. In this embodiment, as in the embodiment of FIG. 1, calculation processing can be performed without interrupting the pipeline, thereby greatly improving the speed of the whole calculation processing.

I claim:

1. An index limited continuous operation vector processor for continuously performing conditional vector operations upon data conditionally selected out of data in arrays of data, comprising:

first memory means for storing a plurality of arrays of data;

second memory means for storing a plurality of sets of indexes as index sets;

first specifying means for specifying one of said index sets by holding an address of a location of an element of the specified index set;

second specifying means for specifying another one of said index sets by holding an address of a location into which an element of the specified index set is stored;

test condition means having a data input port and a result output port, for generating and outputting a signal from said output port if and only if the input data fed through said data input port meets one of a plurality of predetermined conditions; and pipeline means having stages for performing conditional vector operations upon said arrays of data, including:

index read stages for successively reading-out indexes of an index set specified by said first specifying means from the second memory means;

selecting stages for successively reading-out selected data of arrays from the first memory means, wherein the selection is made such that every datum corresponds to each index fed from said index read stages, respectively;

operating stages for performing one of a plurality of arithmetic and logical operations upon every datum fed from said selecting stages, generating an operation result and feeding the result at least to the data input port of said test condition means; and classifying stages for classifying every index fed from said index read stages and storing each of said indexes into the location specified by the second specifying means and making new index sets for later conditional vector operations, wherein the classification is made according to the signal fed from said test condition means.

2. An index limited continuous operation vector processor for continuously performing conditional vector operations upon data conditionally selected out of data in arrays of data, comprising:

first memory means for storing a plurality of arrays of data;

second memory means for storing a plurality of sets of indexes as index sets;

first specifying means for specifying one of said index sets by holding an address of a location of an element of the specified index set;

second specifying means for specifying another one of said index sets by holding an address of a location into which an element of the specified index set is stored and;

pipeline means having stages for performing conditional vector operations upon said arrays of data, including:

index read stages for successively reading-out indexes of an index set specified by said first specifying means from the second memory means;

selecting stages for successively reading-out selected data of arrays from the first memory means, wherein the selection is made such that every datum corresponds to each index fed from said index read stages, respectively;

operating stages for performing one of a plurality of arithmetic and logical conditions upon every datum fed from said selecting stages and generating an operation result;

check stages for checking whether the operation result generated at the operating stages coincides with a predetermined check data and generating an output signal representing the result of the checking; and classifying stages for classifying every index fed from said index read stages and storing each of said indexes into the location specified by the second specifying means and making new index sets for later conditional vector operations, wherein the classification is made according to the output signal of said check stages.

* * * * *